United States Patent
Henning et al.

(10) Patent No.: US 11,320,009 B2
(45) Date of Patent: May 3, 2022

(54) ELECTRIC ADJUSTING DEVICE FOR A DISC BRAKE

(71) Applicant: WABCO Europe BVBA, Brussels (BE)

(72) Inventors: Paul Henning, Schwetzingen (DE); Marcel Kalmbach, Ilsfeld (DE); David Lamla, Ketsch (DE)

(73) Assignee: WABCO Europe BVBA, Brussels (BE)

( * ) Notice: Subject to any disclaimer, the term of this patent is extended or adjusted under 35 U.S.C. 154(b) by 65 days.

(21) Appl. No.: 16/758,453

(22) PCT Filed: Nov. 22, 2017

(86) PCT No.: PCT/EP2017/080053
§ 371 (c)(1),
(2) Date: Apr. 23, 2020

(87) PCT Pub. No.: WO2019/101303
PCT Pub. Date: May 31, 2019

(65) Prior Publication Data
US 2020/0256409 A1    Aug. 13, 2020

(51) Int. Cl.
*B60T 17/22*   (2006.01)
*F16D 55/226*  (2006.01)
*F16D 65/18*   (2006.01)
*F16D 65/56*   (2006.01)
*F16D 55/00*   (2006.01)
(Continued)

(52) U.S. Cl.
CPC ......... *F16D 55/226* (2013.01); *F16D 65/183* (2013.01); *F16D 65/567* (2013.01); *F16D 2055/0016* (2013.01); *F16D 2065/386* (2013.01); *F16D 2121/14* (2013.01); *F16D 2121/24* (2013.01); *F16D 2125/40* (2013.01); *F16D 2125/64* (2013.01)

(58) Field of Classification Search
CPC ...... F16D 55/226; F16D 55/228; F16D 65/14; F16D 65/18; F16D 65/56; F16D 65/183; B60T 13/74
USPC ............................. 188/1.11 L, 72.2, 158–164
See application file for complete search history.

(56) References Cited

U.S. PATENT DOCUMENTS

| 7,021,414 | B2 * | 4/2006 | Campbell | ............... | B60G 9/00 180/254 |
| 7,219,772 | B2 * | 5/2007 | Bieker | .................. | F16D 55/22 188/1.11 L |

(Continued)

FOREIGN PATENT DOCUMENTS

DE   10139913 A1   9/2002
DE   10305702 A1   10/2003
(Continued)

OTHER PUBLICATIONS

European Patent Office, Rijswijk, Netherlands, International Search Report of International Application No. PCT/EP2017/080053, dated Sep. 11, 2018, 3 pages.

*Primary Examiner* — Christopher P Schwartz
(74) *Attorney, Agent, or Firm* — Dickinson Wright PLLC

(57) ABSTRACT

The invention relates to an electric adjusting device for a disc brake, comprising a brake disc and a brake caliper of a vehicle for adjusting the wear of brake linings. The electric adjusting device comprises a motor, a force transmission device, a sensor unit and an actuating unit.

12 Claims, 7 Drawing Sheets

(51) Int. Cl.
    *F16D 65/38*     (2006.01)
    *F16D 121/14*     (2012.01)
    *F16D 121/24*     (2012.01)
    *F16D 125/40*     (2012.01)
    *F16D 125/64*     (2012.01)

(56) References Cited

U.S. PATENT DOCUMENTS

| | | | |
|---|---|---|---|
| 10,030,728 B2* | 7/2018 | Chelaidite | F16D 55/227 |
| 10,704,629 B2* | 7/2020 | Fuchs | F16D 65/567 |
| 2005/0241894 A1* | 11/2005 | Baumgartner | F16D 66/028 |
| | | | 188/79.51 |
| 2007/0001511 A1* | 1/2007 | Baumgartner | G01P 1/026 |
| | | | 303/168 |
| 2009/0194377 A1* | 8/2009 | Baumgartner | F16D 65/40 |
| | | | 188/72.2 |
| 2014/0166412 A1 | 6/2014 | Howard et al. | |
| 2017/0219036 A1 | 8/2017 | Song | |

FOREIGN PATENT DOCUMENTS

| | | |
|---|---|---|
| DE | 102012003506 A1 | 8/2013 |
| DE | 102013222718 A1 | 5/2015 |
| DE | 102015117252 A1 | 4/2017 |

\* cited by examiner

ELECTRIC ADJUSTING DEVICE FOR A DISC BRAKE

TECHNICAL FIELD

The invention relates to an electric adjusting device for a disc brake, comprising a brake disc and a brake caliper of a vehicle for adjusting the wear of brake linings. The electric adjusting device comprises a motor, a force transmission device, a sensor unit and an actuating unit.

BACKGROUND

Adjusting devices for disc brakes are rather well known. Adjusting devices are designed to adjust an air play between the brake disc and at least one brake lining. With increasing wear on the brake lining, due to braking events, the air play increases. The air play is sensed by the sensor unit, evaluated in a control unit, and automatically adjusted by means of the actuating unit. The actuating unit is mechanically or electrically driven with a motor, which is coupled to the actuating unit.

An electric adjusting device is known for example from DE 10 2012 003 506 A1. The brake pad wear adjusting device comprises a mechanical actuating unit and an electric adjusting device, which are arranged together on the application side of the disc brake. The electric adjusting device is situated on top of a shaft with the actuating unit. The electric adjusting device and the actuating unit are integrated individually or axially one behind the other in the brake caliper.

Another variant for the arrangement of an electric wear adjusting device emerges from DE 10 2015 117 252 A1. The wear adjusting device is directly mounted axially on a threaded piston of a spindle unit of the adjusting device. The wear adjusting device consists of a two-stage planetary gearing and an electric motor. Between the planetary gearing and the electric motor there is a housing cover to protect against surrounding factors. The planetary gearing here is integrated in the brake caliper and the electric motor is mounted outside the brake caliper on the housing.

DE 103 05 702 A1 shows another disc brake with an electric motor-driven adjusting device. The electronic control is assembled with the electric motor and the electric terminal connections to form a structural unit. This structural unit, in turn, is arranged in modular fashion on a housing cover for easy service work. The housing cover is connected by an encircling seal to the brake caliper. The sensors and the actuating unit are installed separately in the brake caliper.

SUMMARY

The invention seeks to overcome the drawbacks of the prior art and to provide an electric adjusting device having a modular design and requiring little design space in a brake, especially in a disc brake.

According to the invention, an electric motor is arranged axially parallel to an actuating unit, in the direction of a brake disc, or the electric motor is arranged coaxially to the actuating unit and the sensor unit, or the electric motor is arranged axially parallel to the actuating unit and the sensor unit, in the direction of the brake disc, and the electric motor and the actuating unit are arranged on a carrier plate.

It has been found that the axial parallel arrangement of the electric motor with the actuating unit requires little design space in the brake caliper. For service work, the electric motor and the actuating unit are furthermore arranged on a common carrier plate, so that in event of servicing only the carrier plate needs to be removed from the brake caliper of the disc brake. On the other hand, if the electric motor of the electric adjusting device is arranged axially parallel to the actuating unit and the sensor unit, in the direction of the brake disc, then the sensor unit is arranged coaxially beneath the actuating unit and is thus space-saving and design space-optimized.

It is also conceivable for the electric motor of the electric adjusting device to be arranged coaxially with the actuating unit and the sensor unit. However, the additionally needed axial length of the design space and the tangential length of the design space of the disc brake are a drawback. Furthermore, it is conceivable for the electric motor of the electric adjusting device to be arranged axially parallel with the actuating unit and the sensor unit, opposite the direction of the brake disc, i.e., when the electric motor is situated outside the disc brake then the work step of creating an opening for the electric motor in the brake caliper is eliminated. For protection against surrounding factors, the carrier plate can also have a housing on the outside, so that a seal is produced and the outside situated electric motor is protected against surrounding factors.

Yet the electric motor can also be arranged axially parallel with the actuating unit and the sensor unit, opposite the direction of the brake disc.

Furthermore, it is especially advantageous when the entire electric adjusting device is arranged as a modular unit on the carrier plate. In this way, only a single removal step or mounting step is required for the removal, for the inspection of the components of the electric adjusting device, or for a replacement of the components of the electric adjusting device, or for the reinstalling of the electric adjusting device in the brake caliper. Furthermore, the adjusting device is advantageously arranged on the outside of the disc brake, for example by means of screws, on the brake caliper.

In another advantageous configuration, the electric adjusting device comprises a plug connection for the power supply of the electric motor and the sensor unit, and for transmission of a signal of the sensor unit. The plug connection is the interface with the electric adjusting device. By the plug connection, the electric motor and a sensor unit are actuated. At the same time, the plug connection serves for the power supply of the electric motor of the sensor unit.

It has furthermore proven to be advantageous for the actuating unit of the electric adjusting device to detect an absolute position of the actuating unit. The absolute position serves as a manipulated variable for the regulating of the electric motor. The sensor unit detects the position in which the actuating unit finds itself or, otherwise put, how far the actuating unit has been extended in the axial direction relative to the brake disc. This detected position is called the absolute position. Using the value of the absolute position, the current air play between the brake linings and the brake disc is derived by a comparing of actual to target value. The actual value is the absolute position value, which is determined from the detected position of the actuating unit by an evaluation logic. The target value is a defined air play which should exist between the brake disc and the brake linings. When the actual value and the target value do not match, the difference between the actual value and the target value is used as a manipulated variable for adjustment of the electric motor, in the direction of the brake disc or opposite the brake disc.

Furthermore, the force transmission device of the electric adjusting device comprises a worm gear with a transmission shaft. The transmission shaft comprises a worm shaft provided with one or more screw turns and a worm wheel meshing with the worm shaft and flanged to the actuating unit. The transmission shaft may be a hollow shaft of a solid shaft. The worm gear has the advantage that the worm gear has a compact design in its overall size, unlike a planetary gearing, and therefore requires little design space in the disc brake. Furthermore, the force transmission device of the electric adjusting device comprises a bevel gear having a first bevel wheel flanged to the transmission shaft and a second bevel wheel flanged to the electric motor. The higher efficiency of the first bevel wheel and the second bevel wheel proves to be an advantage. The high efficiency enables an efficient transmission of the force from the motor to the actuating unit.

Furthermore, the worm shaft and the worm wheel are advantageously designed to produce a form fit in both directions of turning and to prevent by the form fit a spontaneous turning of the actuating unit caused by vibrations or other surrounding factors. By other surrounding factors is meant accelerations of any kind, caused by the roadway or the vehicle. Furthermore, other surrounding factors may also be influences of the brake disc or the brake linings. For example, another surrounding factor of the brake disc and the brake linings would be a force on the electric adjusting device of the disc brake due to expansion of the brake linings and the brake disc at very high temperatures.

The transmission shaft in another configuration is locked by form fitting with the electric motor and the sensor unit, the transmission shaft being connected by the bevel gear to the electric motor and by the worm wheel to the sensor unit. In a form fitting, teeth of the first bevel wheel and the second bevel wheel and screw turns of the worm shaft engage with teeth of the worm wheel. By the form fitting, torques of the electric motor are transmitted to the actuating unit.

The electric motor in another configuration is secured to the carrier plate by force locking or form fitting thanks to a connection comprising a screw connection or a bayonet connection. The connections are releasable connections, which can be quickly loosened for a mounting or dismounting. Hence, the electric motor can be replaced as a single component. Preferably, the electric motor is force locked by a plug connection.

In another advantageous configuration, the carrier plate is arranged axially on the outside of the brake caliper. The arrangement on the outside of the brake caliper enables a quick mounting or dismounting of the carrier plate, without having to disassemble the disc brake. Neither are any additional cover, or any additional opening in the disc brake required, through which the carrier plate needs to be mounted or dismounted with the electric adjusting device. The carrier plate is preferably arranged on the outside of the brake caliper, in the radial direction beneath a flange surface, for the mounting of the brake cylinder for the activation of a rotary lever of the disc brake.

Furthermore, in another configuration the carrier plate comprises an encircling seal for sealing off the electric adjusting device against surrounding factors. The encircling seal is arranged axially between the brake caliper and the electric adjusting device.

It has furthermore proven to be advantageous for the worm gear, the transmission shaft and the bevel gear to be arranged at least partly and thus space-saving in the carrier plate and for the brake caliper, after installing the electric adjusting device in the disc brake, to be designed as a cover of the electric adjusting device. It is furthermore conceivable for the worm gear, the transmission shaft and both the first bevel wheel and the second bevel wheel to be integrated entirely in the carrier plate. However, the design depth of the carrier plate in the axial direction of the disc brake is increased by the complete integration.

In another configuration, the carrier plate comprises a first pocket to hold the first bevel wheel, a bead with at least two opposite protrusions to hold the transmission shaft, and a second pocket to hold the worm gear. The first pocket of the carrier plate and the second pocket of the carrier plate are large enough in dimension so that enough freedom of movement is present between the first bevel wheel and the worm wheel. Furthermore, the at least two opposite protrusions are designed to secure the transmission shaft in the bead of the carrier plate. The protrusions are preferably designed as plug connection, in which the transmission shaft is locked or clipped during an installing process.

In the following, chosen exemplary embodiments of the invention shall be explained with the aid of the enclosed figures.

DETAILED DESCRIPTION OF THE DRAWINGS

Figure 1:
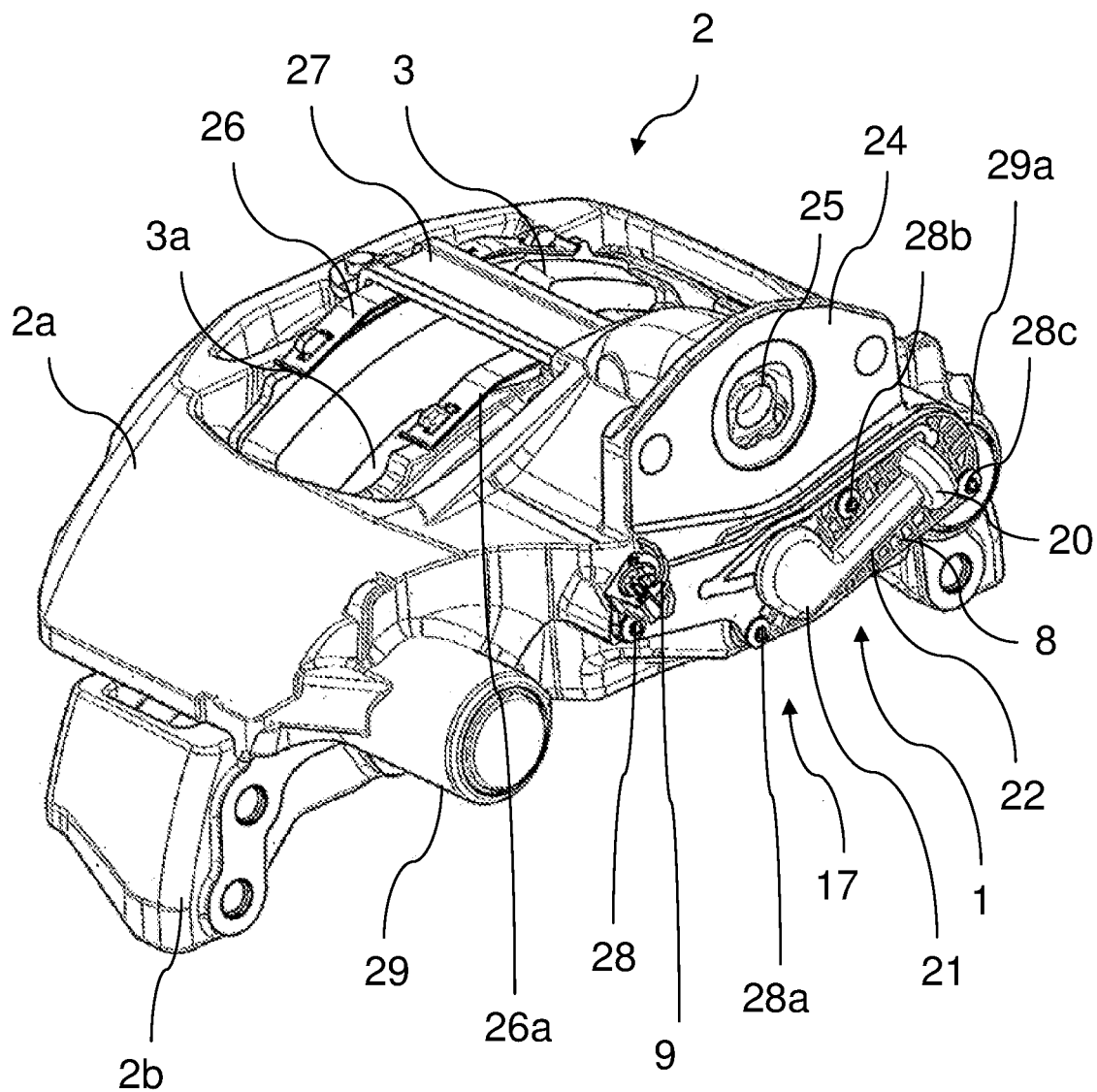
FIG. 1 shows a disc brake of the prior art with an electric adjusting device in the installed state.

FIG. 1 shows a disc brake 2 of the prior art, where the disc brake 2 has been expanded with an electric adjusting device 1 according to the invention. The disc brake 2 comprises a brake caliper 2*a*, which is mounted in sliding manner on a brake carrier 2*b* in the axial direction by means of two guide bolts 29, 29*a*. Furthermore, the disc brake 2 comprises two brake linings 3, 3*a*, each with two hold-down springs 26, 26*a*. A pad retaining bracket 27 prevents the brake linings 3, 3*a* from dropping out or twisting in the radial direction. During a braking event, the brake linings 3, 3*a* are applied by a rotary lever 25, among other things, in the axial direction against a brake disc, not shown. The electric adjusting device 1 comprises a plug connection 9 for its power supply on a carrier plate 8 of the electric adjusting device 1. The electric adjusting device 1 is fastened to the outside 17 of the disc brake 2 on the brake caliper 2*a* by means of four screws 28, 28*a*, 28*b*, 28*c*. Furthermore, the electric adjusting device 1 is situated radially beneath a flange surface 24, for the attachment of a brake cylinder, not shown. There can be distinctly seen on the carrier plate 8 a first pocket 20, a second pocket 21, and a bead 22. The first pocket 20 of the carrier plate 8, the second pocket 21 of the carrier plate 8, and the bead 22 of the carrier plate 8 serve for holding a bevel gear 14, a worm gear 10, and a transmission shaft 13, which are explained more closely in FIG. 3.

Figure 2:
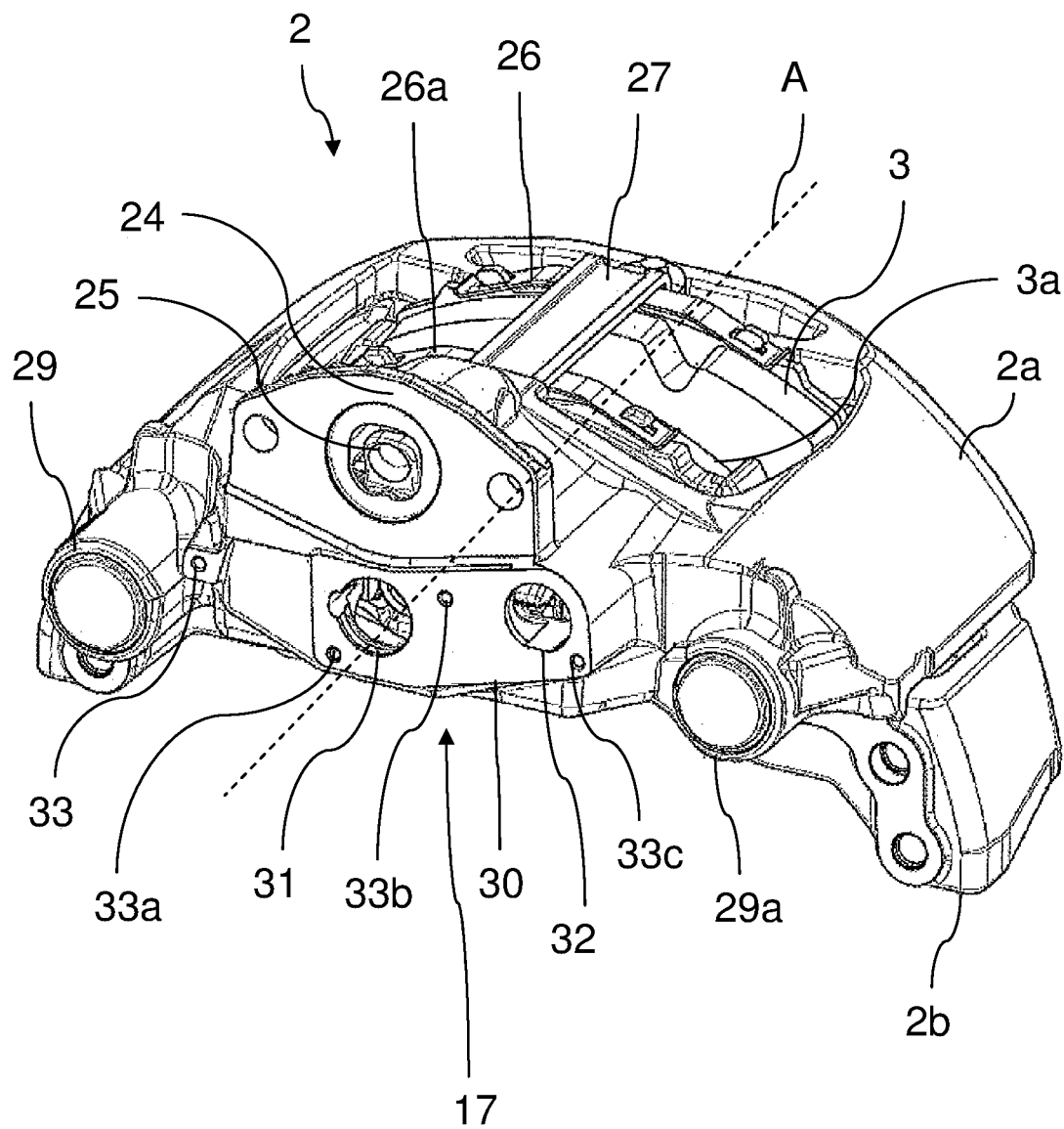
FIG. 2 shows a disc brake of the prior art with an interface for an electric adjusting device.

The disc brake 2 of FIG. 1, but without the electric adjusting device 1 according to the invention, is shown in FIG. 2. The reference numbers and the components for the disc brake 2 of FIG. 2 are the same as in FIG. 1, so that the description of the individual components of the disc brake 2 will not be repeated. In addition to FIG. 1, FIG. 2 shows an axial axis A and an interface 30 for the electric adjusting device 1. The interface 30 has planar milling for the electric adjusting device 1, in the direction of the outside 17 of the disc brake 2. Furthermore, the interface 30 for the electric adjusting device 1 comprises a first opening 31 and a second opening 32 in the axial direction. Four boreholes 33, 33*a*, 33*b*, 33*c* of the interface 30 are devised as blind boreholes and serve for holding the screws 28, 28*a*, 28*b*, 28*c*.

Figure 3:
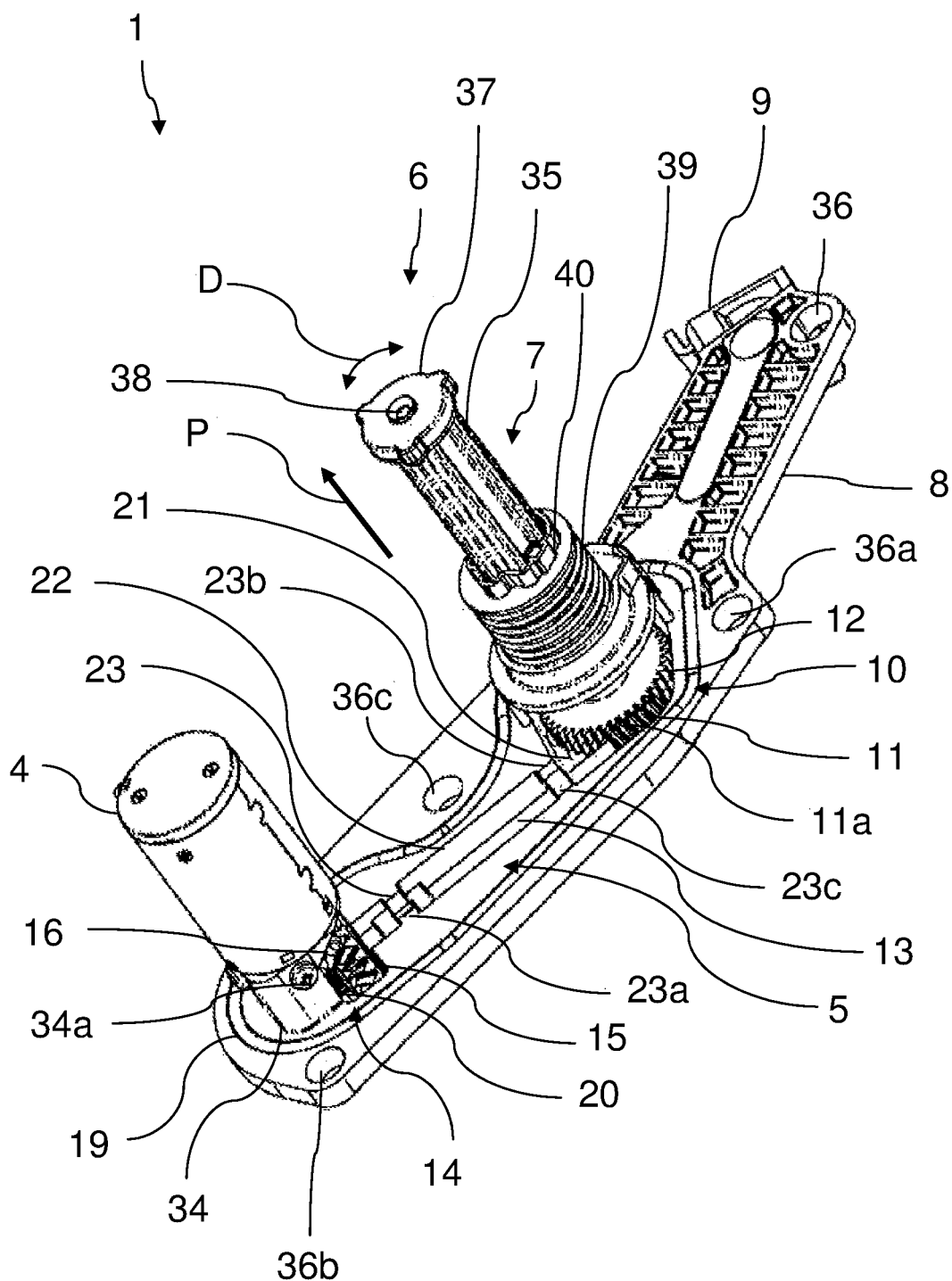
FIG. 3 shows an electric adjusting device in a first rotated side view.

The detailed construction of the electric adjusting device 1 is shown in FIG. 3. The electric adjusting device 1 has a modular construction and comprises an electric motor 4, which is arranged axially parallel to a sensor unit 7 on the carrier plate 8. The sensor unit 7 comprises a compression spring 39, an actuating piston 35 of an actuating unit 6, and a sensor 40. An intermediate piece 34 of the carrier plate 8 connects the electric motor 4 to the carrier plate 8, a screw 34*a* of the intermediate piece 34 of the carrier plate 8 securing the electric motor 4 on the intermediate piece 34 of the carrier plate 8 with force locking. A force transmission device 5 connects the electric motor 4 to the actuating unit 7. The force transmission device 5 comprises a bevel gear 14, a worm gear 10 and a transmission shaft 13. The bevel gear 14 consists of a first bevel wheel 15, which is flanged on the transmission shaft 13, and a second bevel wheel 16, which is flanged on the electric motor 4. The first bevel wheel 15 and the second bevel wheel 16 are joined together by form fitting. The worm gear 10, on the other hand, consists of a worm wheel 12, which is flanged to the actuating unit 6, and a worm shaft 11 of the transmission shaft 13, provided with multiple screw turns 11*a*. The worm shaft 11 meshes with the worm wheel 12 and produces a form fitting in both directions of turning D, i.e., clockwise and counterclockwise. The worm shaft 11 has a gradient in both directions of turning D, which produces a self-locking. Thus, the worm shaft 11 blocks the worm wheel 12 in both directions of turning D and prevents an unintentional movement of the actuating unit 6. The transmission shaft 13 is locked by the bevel gear 14 with form fitting to the electric motor 4 and by the worm gear 10 with form fitting to the actuating unit 6. The worm wheel 12 is arranged in the second pocket 21 of the carrier plate 8. The transmission shaft 13 is arranged in the bead 22 of the carrier plate 8, the transmission shaft 13 being secured with force locking by four protrusions 23, 23*a*, 23*b*, 23*c* of the bead 22. Furthermore, the sensor unit 7 is arranged coaxially beneath an actuating unit 6. The actuating unit consists of a driver disc 37 and a connecting shaft 38, the driver disc 37 being secured to the connecting shaft 38. The purpose of the sensor unit 7 is to detect an absolute position P of the driver disc 37. The detected absolute position P is then used as a manipulated variable for regulating the electric motor 4 in order to adjust the air play actively between the brake disc and the brake linings 3, 3*a* (shown in FIGS. 1 and 2). By active adjusting of the air play is meant an adapting of the air play to the particular driving situation. During an air play adjustment, the electric motor 4 transmits a torque, dependent on the absolute position P of the driver disc 37, to the bevel gear 14, and the bevel gear 14 transmits the torque across the transmission shaft 13 to the worm gear 10. The worm gear 10 transmits the torque to the actuating unit 6, thereby turning the driver disc 37. Thanks to the turning of the driver disc 37, the sensor 40 slides axially along the actuating piston 35 of the actuating unit 6 in the direction of the absolute position P, or in the direction of the driver disc 37, or for a restoring of the brake linings 3, 3*a* (FIG. 1 and FIG. 2), due to a changing of a brake lining or service work, it slides axially opposite the direction of the driver disc 37. For the power supply, the electric motor 4 and the sensor unit 7 are connected by power cables to the plug connection 9, situated radially on the carrier plate 8. An encircling seal 19 in the carrier plate 8 seals off the disc brake 2 of FIGS. 1 and 2 against surrounding factors. The electric motor 4, the actuating unit 6 and the sensor unit 7 are arranged inside the encircling seal 19 of the carrier plate 8, so that in the installed state of the electric adjusting device 1 per FIG. 1 the encircling seal 19 of the carrier plate 8 also protects the electric motor 4, the actuating unit 6 and the sensor unit 7 against surrounding factors. The carrier plate 8 is to be regarded as a kind of cover, which closes the interface 30 for the electric adjusting device 1 on the brake caliper 2*a* (FIG. 1) and seals it off by the encircling seal 19. Furthermore, the carrier plate 8 has four boreholes 36, 36*a*, 36*b*, 36*c* for fastening the electric adjusting device 1 on the interface 30 for the electric adjusting device 1 of the brake caliper 2*a*.

Figure 4:
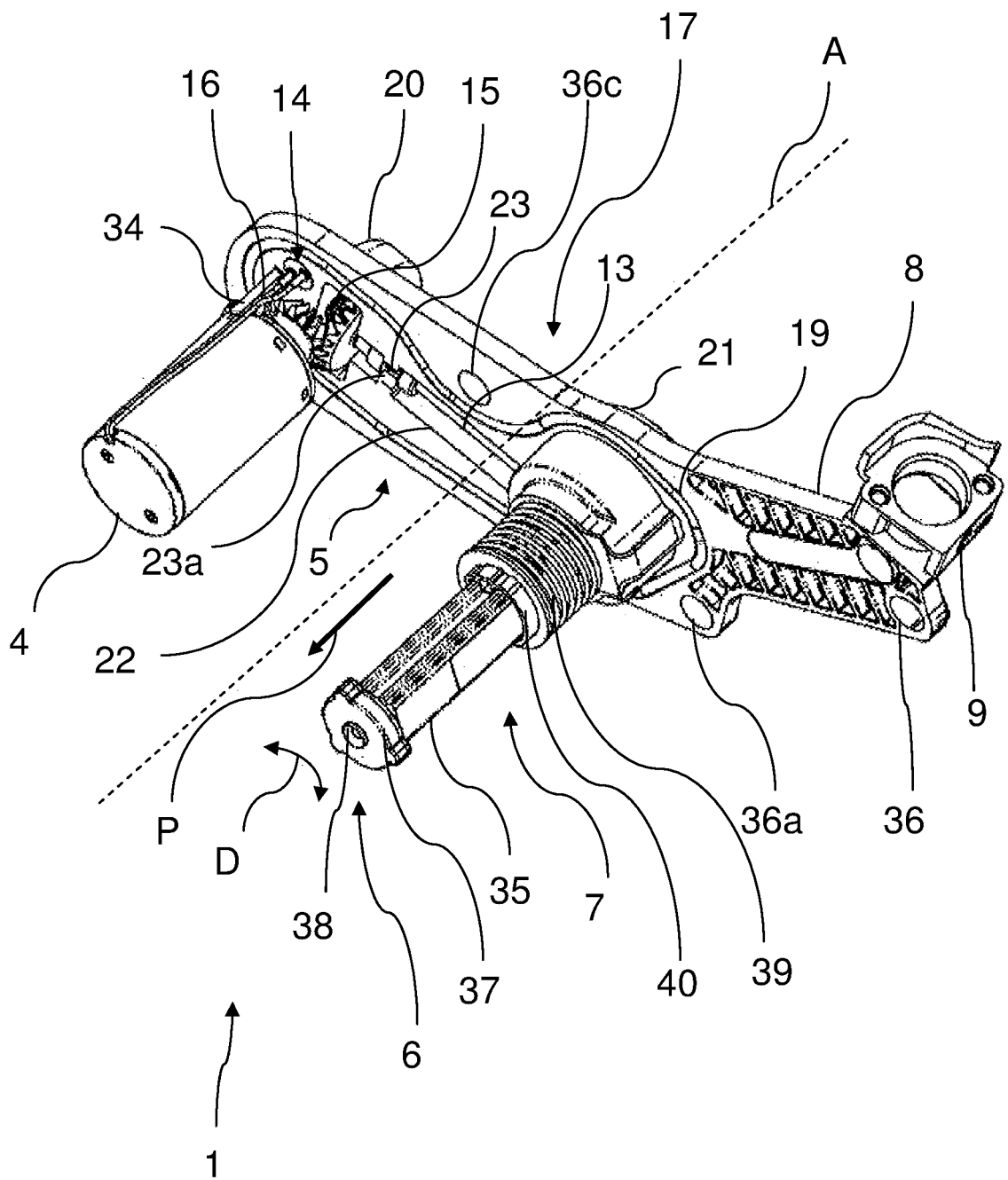
FIG. 4 shows an electric adjusting device in a second rotated side view.

FIG. 4 shows the electric adjusting device 1 of FIGS. 1 and 3, but with a different perspective looking at the electric adjusting device 1. All components with reference numbers are the same as those of FIGS. 1 and 3, so that the description of the depicted components will not be given again. Unlike FIG. 3, FIG. 4 has the axial axis A. It is clearly evident from the perspective view of FIG. 4 that the first bevel wheel 15 is arranged only partly in the first pocket 20 of the carrier plate 8, so that the first bevel wheel 15 and the second bevel wheel 16 mesh completely with each other and form a form fitting. Furthermore, the configuration of the first pocket 20 of the carrier plate and the second pocket 21 of the carrier plate 8 can be seen. The first pocket 20 of the carrier plate 8 is formed axially, in the direction of the outside 17 of the disc brake, as a semicircular cylindrical pocket, having a larger component length than the second pocket 21 of the carrier plate 8. The second pocket 21 of the carrier plate 8 has partly the shape of a circular cylinder axially, in the direction of the outside 17 of the brake caliper 2*a* (FIG. 1).

Figure 5:
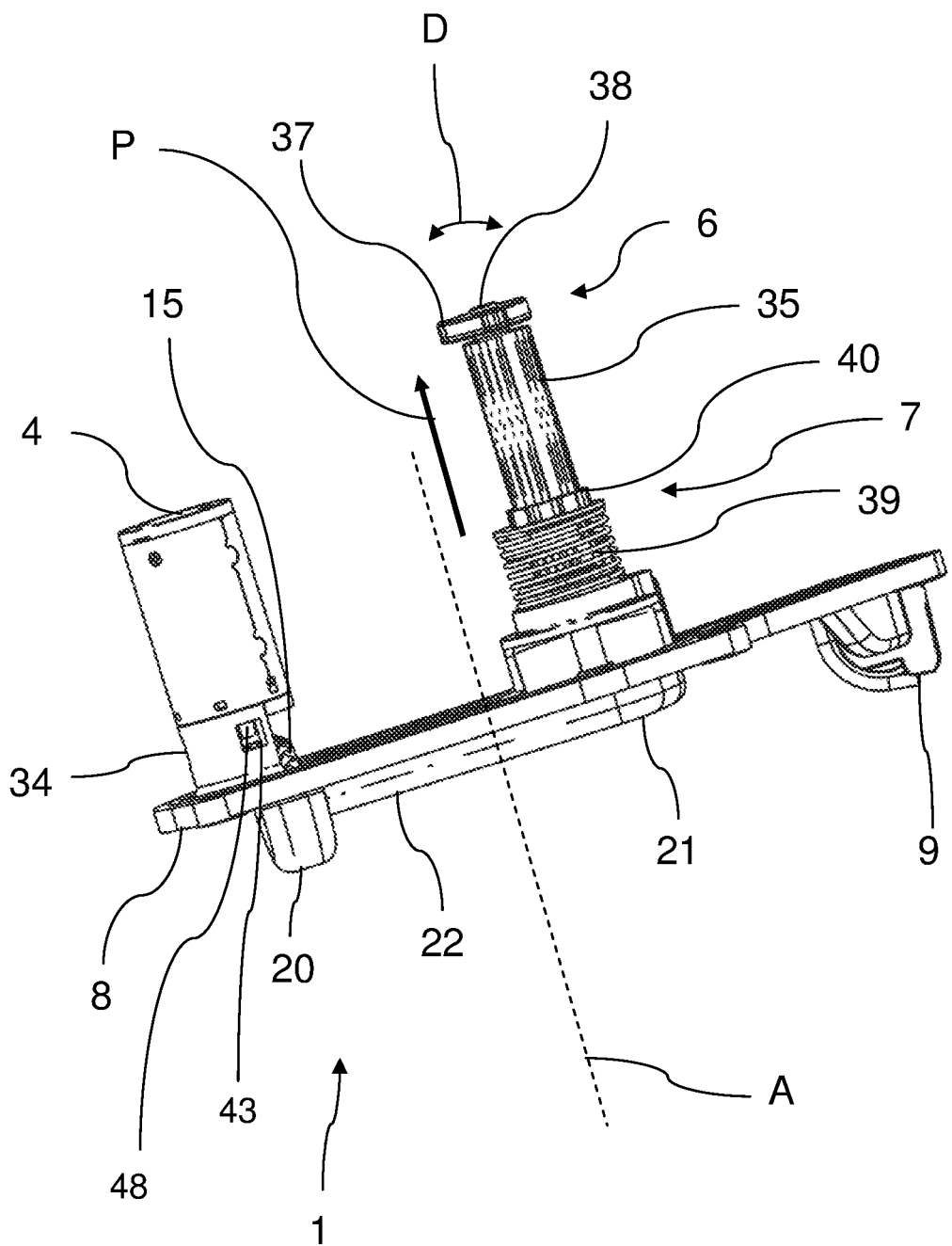
FIG. 5 shows an electric adjusting device in a rotated side view, the electric motor being connected by a plug connection to the intermediate piece of the carrier plate.

FIG. 5 shows an electric adjusting device 1 according to FIGS. 1, 3, and 4. However, the attachment of the electric motor 4 via the intermediate piece 34 to the carrier plate 8 is done not by a screw connection 34*a*, but instead by a plug connection 43, 48; 43*a*, 48*a*; 43*b*, 48*b*. In FIG. 5, only the plug 43 and the recess 48 can be seen, due to the sideways turned representation. The electric motor 4 is mounted on the intermediate piece 34 of the carrier plate 8, parallel to the axial axis A.

Figure 5A:
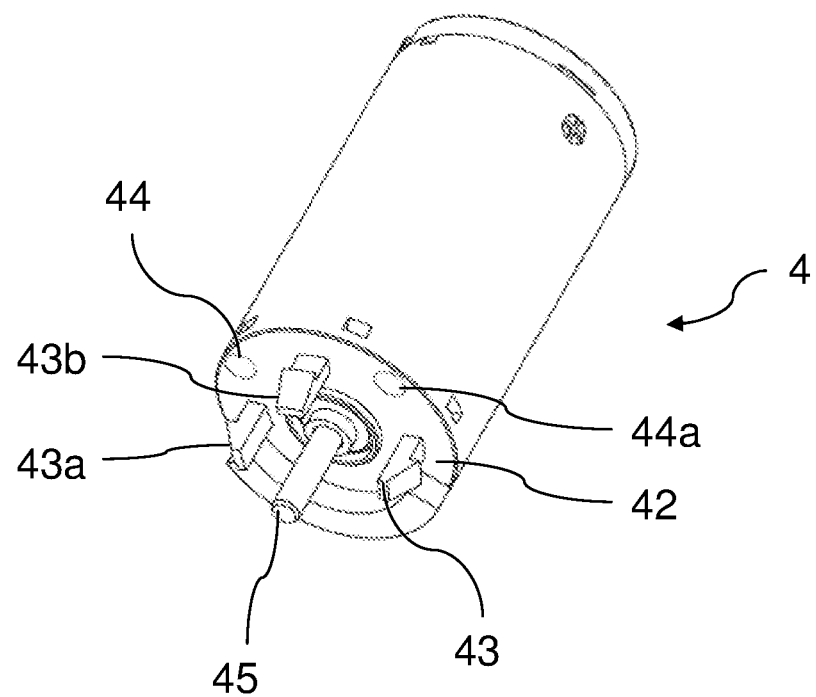
FIG. 5*a* shows an electric motor with a plug for an electric adjusting device per FIG. 5.

FIG. 5*a* shows the electric motor 4 of FIG. 5 in detail. The plugs 43, 43*a*, 43*b* of the plug connection 43, 48; 43*a*, 48*a*; 43*b*, 48*b* are configured as barbs and arranged on a mounting surface 42 of the electric motor 4. A drive shaft 45 of the electric motor 4 is arranged axially on the mounting surface 42, transmitting the force of the electric motor 4, generated as a torque, to the force transmission device 5 (shown in FIG. 3 and FIG. 4). Furthermore, the electric motor 4 has a first contact face 44 and a second contact face 44*a*. The first contact face 44 is configured as the electric plus pole and the second contact face 44*a* as the electric minus pole. The carrier plate 8 of FIG. 5 likewise has two contact faces, not shown, in the area of the intermediate piece 34 of the carrier plate 8, one contact face being configured as the electric plus pole and another contact face as the electric minus pole. The contact faces of the carrier plate 8 that are not shown, the first contact face 44 of the electric motor 4, and the second contact face 44*a* of the electric motor 4 are designed to supply the electric motor 4 with electric power. For this, in one arrangement of the electric motor 4 per FIG. 5, the first contact face 44 is in contact with the positive polarized contact face of the carrier plate 8, not shown. Furthermore, the second contact face 44*a* is in contact with the negative polarized contact face of the carrier plate 8, not shown.

Figure 5B:
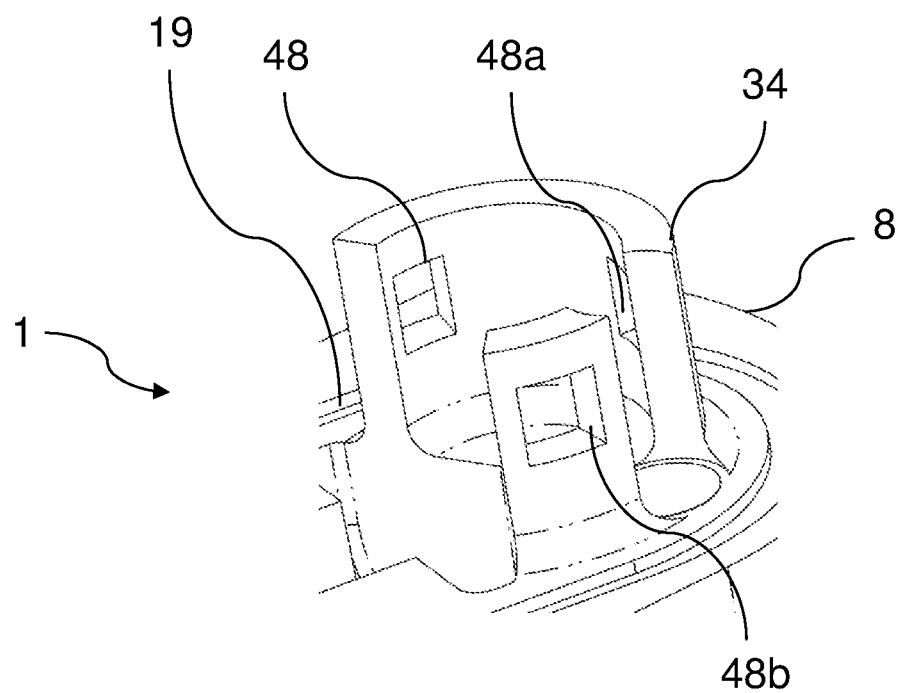
FIG. 5*b* shows a detail view of an intermediate piece of the carrier plate for an electric adjusting device, the intermediate piece of the carrier plate having recesses for the plug of the plug connection.

A detail view of the intermediate piece 34 of the carrier plate 8 of FIG. 5 is shown by FIG. 5*b*. The recesses 48, 48*a*, 48*b* can be seen very distinctly here. The plugs 43, 43*a*, 43*b* of the plug connection 43, 48; 43*a*, 48*a*; 43*b*, 48*b* are inserted into the recesses 48, 48*a*, 48*b* and connect the electric motor 4 by force locking to the intermediate piece 34 of the carrier plate 8.

Figure 6:
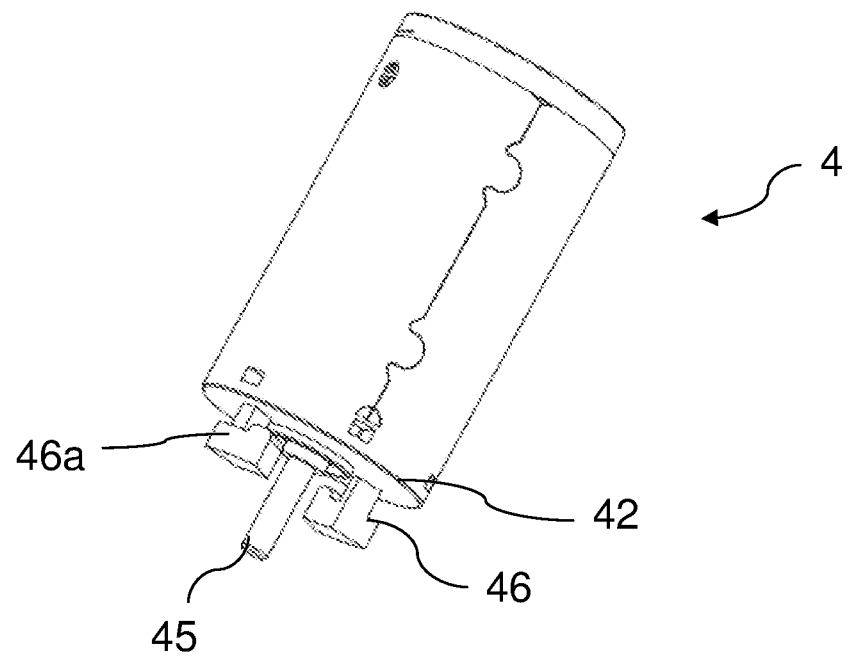
FIG. 6 shows an electric motor with two closure parts for a bayonet connection.

FIG. 6 shows another configuration of the electric motor 4 for connecting the electric motor 4 to the intermediate piece 34 of the carrier plate 8 of an electric adjusting device 1 per FIG. 1, 3, 4, 5. The electric motor 4 in this exemplary embodiment has two closure parts 46, 46*a* on the mounting surface 42 and a drive shaft 45 of the electric motor 4. The closure parts 46, 46*a* are part of a bayonet connection (46, 47; 46*a*), the lengthwise slot 47 of the intermediate piece 34 of the carrier plate 8 being explained more closely in FIG. 6*a*.

Figure 6A:
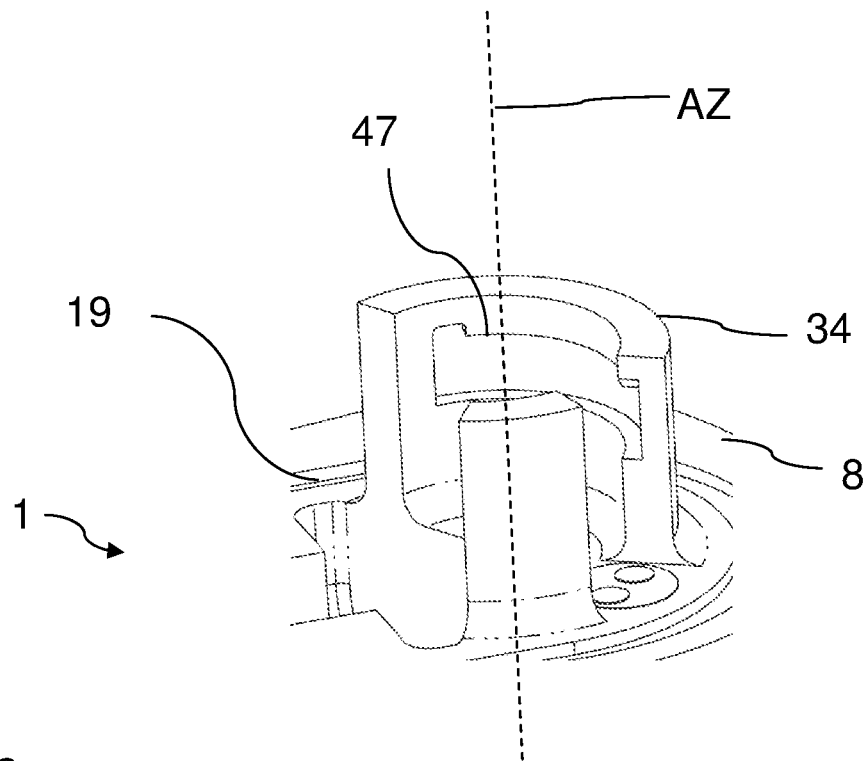
FIG. 6*a* shows a detail view of an intermediate piece of the carrier plate for an electric adjusting device, the intermediate piece of the carrier plate having slots for the bayonet connection.

FIG. 6*a* shows the configuration of the intermediate piece 34 of the carrier plate 8 to produce a bayonet connection (46, 47; 46*a*). For a better understanding, also refer to FIG. 6. The intermediate piece 34 of the carrier plate 8 has a lengthwise slot 47, at whose ends a short transverse slot is positioned at right angles. Furthermore, an axial axis AZ of the intermediate piece 34 of the carrier plate 8 is shown. The electric motor 4 of FIG. 6 is installed axially in the intermediate piece 34 of the carrier plate 8 and they are pressed together by a rotary movement. The bayonet connection (46, 47; 46*a*) works like a screw thread.

The closure part 46 is inserted in the lengthwise slot 47 of the intermediate piece 34 of the carrier plate 8. The closure part 46*a* is inserted in another lengthwise slot of the intermediate piece 34 of the carrier plate 8, not shown. The lengthwise slot of the intermediate piece 34 of the carrier plate 8 that is not shown is arranged axially on the opposite side of the lengthwise slot 47 of the intermediate piece 34 of the carrier plate 8.

While the above description constitutes the preferred embodiments of the present invention, the present invention is susceptible to modification, variation and

What is claimed is:

1. An electric adjusting device (1) for a disc brake (2) having a brake disc and a brake caliper (2*a*) of a vehicle for adjusting the wear of brake linings (3, 3*a*), the electric adjusting device (1) comprising:
   an electric motor (4),
   a force transmission device (5),
   a sensor unit (7), and
   an actuating unit (6),
   wherein the electric motor (4) is oriented in one of the following arrangements:
      axially parallel to the actuating unit (6) toward the brake disc, axially parallel to the actuating unit (6) and the sensor unit (7) toward the brake disc, or
      coaxial with the actuating unit and the sensor unit, and the electric motor (4) and the actuating unit (6) are arranged on a carrier plate (8).

2. The electric adjusting device (1) for a disc brake (2) as claimed in claim 1, wherein a carrier plate (8) comprises:
   a. a first pocket (20) to hold the first bevel wheel (15),
   b. a bead (22) with at least two opposite protrusions (23, 23*a*; 23*b*, 23*c*) to hold a transmission shaft (13), and
   c. a second pocket (21) to hold a worm gear (10).

3. The electric adjusting device (1) for a disc brake (2) as claimed in claim 2, wherein the at least two opposite protrusions (23, 23*a*; 23*b*, 23*c*) are configured to secure the transmission shaft (13) in the bead (22) of the carrier plate (8).

4. The electric adjusting device (1) for a disc brake (2) as claimed in claim 1, wherein the electric adjusting device (1) comprises a plug connection (9) for the power supply of the electric motor (4) and the sensor unit (7), and for transmission of a signal of the sensor unit (7).

5. The electric adjusting device (1) for a disc brake (2) as claimed claim 1, wherein the electric motor (4) is secured to the carrier plate (8) by force locking or form fitting due to a connection comprising a screw connection (34, 34*a*), a plug connection (43, 48; 43*a*, 48*a*; 43*b*, 48*b*) or a bayonet connection (46, 47; 46*a*).

6. The electric adjusting device (1) for a disc brake (2) as claimed in claim 1, wherein the carrier plate (8) is arranged axially on the outside (17) of the brake caliper (2*a*).

7. The electric adjusting device (1) for a disc brake (2) as claimed in claim 1, wherein the carrier plate (8) comprises an encircling seal (19) for sealing off the electric adjusting device (1) against surrounding factors and the encircling seal (19) is arranged axially between the brake caliper (2*a*) and the adjusting device (1).

8. The electric adjusting device (1) for a disc brake (2) as claimed in claim 1, wherein a worm gear (10), a transmission shaft (13) and a bevel gear (14) are arranged at least partly in the carrier plate (8) and the brake caliper (2*a*), after installing the electric adjusting device (1) in the disc brake (2), is a cover of the electric adjusting device (1).

9. An electric adjusting device (1) for a disc brake (2) having brake disc and a brake caliper (2*a*) of a vehicle for adjusting the wear of brake linings (3, 3*a*), the electric adjusting device (1) comprising:
   an electric motor (4),
   a force transmission device (5),
   a sensor unit (7), and
   an actuating unit (6),
   wherein the electric motor (4) is oriented in one of the following arrangements:
      axially parallel to the actuating unit (6) toward the brake disc,
      axially parallel to the actuating unit (6) and the sensor unit (7) toward the brake disc, or
      coaxial with the actuating unit and the sensor unit, and the electric motor (4) and the actuating unit (6) are arranged on a carrier plate (8);
   wherein the force transmission device (5) of the electric adjusting device (1) comprises the following features:
      a worm gear (10) with a transmission shaft (13), wherein the transmission shaft (13) comprises a worm shaft (11) provided with one or more screw turns (11*a*) and a worm wheel (12) meshing with the worm shaft (11) and flanged to the actuating unit (6), and a bevel gear (14), comprising a first bevel wheel (15) flanged to the transmission shaft (13) and a second bevel wheel (16) flanged to the electric motor (4).

10. The electric adjusting device (1) for a disc brake (2) as claimed in claim 9, wherein the worm shaft (11) and the worm wheel (12) are configured to produce a form fit in both directions of turning (D) and to prevent by the form fit a spontaneous turning of the actuating unit (6) caused by vibrations or other surrounding factors.

11. The electric adjusting device (1) for a disc brake (2) as claimed in claim 9, wherein the transmission shaft (13) is locked by form fitting with the electric motor (4) and the sensor unit (7), the transmission shaft (13) being connected by the bevel gear (14) to the electric motor (4) and by the worm wheel (12) to the sensor unit (7).

12. An electric adjusting device (1) for a disc brake (2) having brake disc and a brake caliper (2a) of a vehicle for adjusting the wear of brake linings (3, 3a), the electric adjusting device (1) comprising:
  an electric motor (4),
  a force transmission device (5),
  a sensor unit (7), and
  an actuating unit (6),
  wherein the electric motor (4) is oriented in one of the following arrangements:
    axially parallel to the actuating unit (6) toward the brake disc,
    axially parallel to the actuating unit (6) and the sensor unit (7) toward the brake disc, or
    coaxial with the actuating unit and the sensor unit, and
  the electric motor (4) and the actuating unit (6) are arranged on a carrier plate (8);
  wherein the sensor unit (7) of the electric adjusting device (1) detects an absolute position (P) of the actuating unit (6), wherein the absolute position (P) serves as a manipulated variable for regulating the electric motor (4), and the absolute position (P) is determined from a detected position of the actuating unit (6) by an evaluation logic.

* * * * *